Patented July 2, 1935

2,006,718

UNITED STATES PATENT OFFICE 2,006,718

MANUFACTURE OF INDOLES

Henry Alfred Piggott and Ernest Harry Rodd, Blackley, Manchester, England, assignors to Imperial Chemical Industries Limited, Westminster, England No Drawing. Application March 18, 1930, Serial No. 436,884. In Great Britain March 26, 1929

12 Claims. (Cl. 260—47)

The cyclization of acylated o-toluidines with production of indole derivatives is known and described in chemical literature. As condensing agents, the alkaline earth oxides, sodium alkoxides, and sodamide have already been described by Madelung (Berichte 1912, 45, p. 1128), and Verley (Bulletin de la Societe Chimique 1924, 35, 1039: 1925, 37, 189) and in the case of sodamide it has been found possible to replace part of the sodamide by metallic sodium (British specification No. 303,467).

We have now found new and different methods of producing certain substituted indoles which are better and have many advantages over the prior art processes. By our new processes, it is not only possible to prepare certain known indole compounds with greater ease and in excellent and improved yields, but it is also possible to prepare certain new indole derivatives which were heretofore unknown.

We have discovered that 2-methyl-indole may be prepared with greater ease and in excellent yield by the action of alkali metal, e. g., sodium, on acetyl-ortho-toluidine in an inert solvent. This reaction may advantageously be effected in the presence of primary aromatic amines; although the reaction is satisfactory in the absence of such primary aromatic amines. Further we find that the reaction may be advantageously effected in the presence of certain catalysts, for instance, a copper catalyst, such as copper powder or commercial copper bronze. The use of such catalyst greatly shortens the time required for reaction and improves the yield. Also, the reaction products may be more easily isolated, recovered and purified. With the copper catalyst, the amount of alkali metal used may be somewhat reduced. This is an advantage in that the purification process may be simplified there being not as much "excess" alkali metal to be subsequently disposed of; this excess being practically negligible in some instances.

We have further discovered that the above methods may be likewise applied to other ortho-alkyl-substituted acylated-aromatic compounds of the anilide type; that is, to the generic class of compounds having the probable general formula:

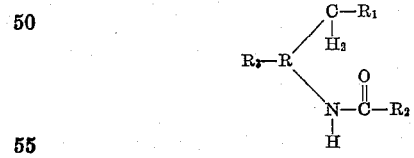

wherein R represents an aromatic radical of the carbocylic type, $R_1$ and $R_3$ represent hydrogen or a methyl radical and $R_2$ represents a hydrocarbon radical. We have found that our new process may be advantageously applied to such compounds wherein the aromatic nucleus represented by R is benzene, naphthalene, anthracene and similar carbocylic nuclei. Likewise it may be advantageously applied to such compounds wherein the radicals represented by $R_1$ and $R_3$ are alkyl groups, for instance. One or both of the substituents designated as $R_1$ and $R_3$ may be a methyl group. Our process may be applied to those compounds of this type in which $R_2$ represents a simple or complex organic radical. For instance the substituent designated as $R_2$ may be a methyl, ethyl or phenyl group. The radical represented by $R_2$ may be rather complex in structure, as for instance an indole group attached by means of a methylene group; that is, compounds of the di-indolyl methane type.

Our new process generically comprises heating together in the presence of an inert solvent, an alkali metal and a compound of the general type:

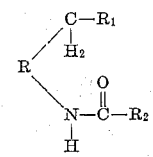

and recovering or isolating the substituted indoles thus obtained. The reaction may be advantageously effected in the presence of a catalyst. The alkali metal may be advantageously metallic sodium. Further the inert solvent may be an organic compound, for instance diethylaniline or tetrahydronaphthalene. It is sometimes advantageous to effect the reaction in the presence of a primary aromatic amine, such as ortho-toluidine. In isolating and recovering the reaction products, the inert solvent may be removed by distillation and the residue treated in a suitable manner to recover the substituted indole, in a substantially pure condition. In our process the yield of substituted indole is surprisingly excellent and the purity of the product of high order so that in many cases further purification is not necessary.

The substituted indoles obtained by our new process may be represented by the following probable formula:

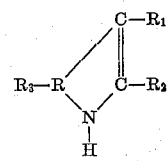

Within this generic class of compounds there are many subgeneric classes which may be advantageously prepared by our method; some being new classes of compounds. Certain of these subgeneric classes are as follows:

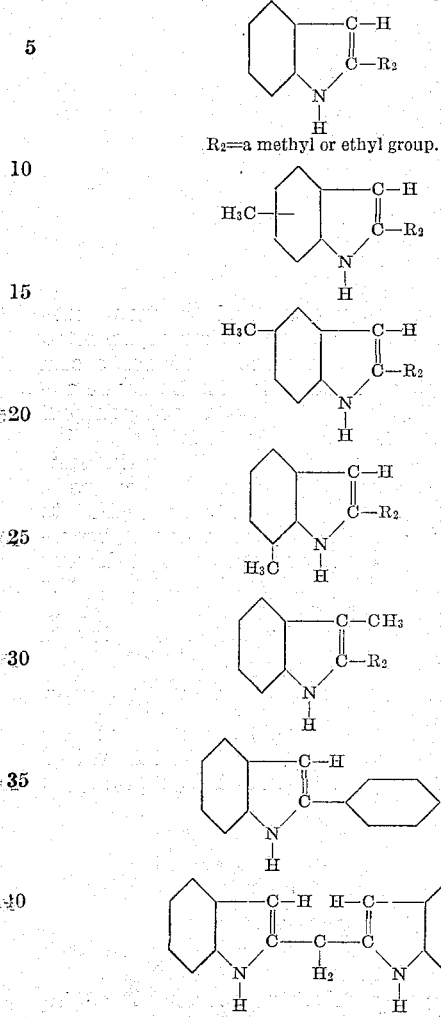

Our invention is illustrated, but not limited by the following examples, in which the parts are by weight.

*Example 1*

A solution of 70 parts of acetyl-o-toluidine in 250 parts of diethylaniline is heated to boiling with 35 parts of sodium and kept boiling with vigorous agitation for 24 hours. The solvent is then removed by distillation; the residue is cooled and excess of sodium is destroyed by adding methylated spirit. When all the sodium has thus interacted water is added to decompose the sodium compounds. The α-methylindole is separated by distillation in superheated steam or by other appropriate means.

*Example 2*

To a solution of 70 parts of acetyl-o-toluidine in 250 parts of diethylaniline, 23 parts of sodium and 5 parts of copper powder are added. The mixture is brought to the boil with vigorous agitation and kept boiling until all the sodium has dissolved. The solvent is then removed by distillation, the residue containing the sodium derivative is poured into water and the separated α-methylindole is purified by distillation under diminished pressure.

*Example 3*

50 parts of acetyl-o-toluidine is dissolved in 300 parts of diethylaniline containing 43 parts of o-toluidine. The mixture is rapidly stirred and heated to boiling with 24.8 parts of sodium and 5 parts of copper powder until all the sodium has dissolved, which occurs very rapidly. The mixture is then poured into water and the α-methylindole separated from the lower-boiling basic substances either by addition of acid, or by distillation in a vacuum or a combination of these processes.

*Example 4*

α-methylindole is prepared according to the method described in Example 2 with the modification that 5 parts of commercial copper bronze powder are used in place of 5 parts of pure copper.

*Example 5*

A stirred mixture of 30 parts of acetyl-o-toluidine, 9.2 parts of sodium, 1.0 parts of copper bronze and 100 parts of tetrahydronaphthalene is heated in a bath at 200–220° C. until all the sodium has dissolved. The solvent is then removed by distillation and the product worked up as described in Example 3.

*Example 6*

A stirred mixture of 48.0 parts of propionyl-o-toluidine, 14.0 parts of sodium, 1.2 parts of copper bronze powder and 100 parts of diethyl-aniline is boiled until all the sodium has dissolved. The solvent is then removed by distillation and the product is worked up in the usual way. The α-ethyl indole obtained boils at 160–170° C. at a pressure of 25 mm. and crystallizes from ligroin in colourless plates, having a melting point of 35° C.

*Example 7*

A mixture of 64.5 parts of acetyl-as-m-xylidine, 19.0 parts of sodium, 2.0 parts of copper bronze powder and 60 parts of diethylaniline is treated as described in Example 6. The 2,5-dimethylindole obtained boils at 188° C. under a pressure of 40 mm. and crystallizes from alcohol in plates, having a melting point of 114–115° C.

*Example 8*

A stirred mixture of 82 parts of acetyl-vic-m-xylidine, 23 parts sodium, 2 parts copper bronze powder, and 150 parts of diethylaniline is treated as described in Example 7. 2,7-dimethylindole, boiling point 146–148° C. at a pressure of 10 mm. crystallizing from ligroin, as crystals having a melting point of 35–37° C. is thus obtained. This compound is not described elsewhere. It forms a picrate having a melting point of 154–155° C.

*Example 9*

A stirred mixture of 53 parts of benzoyl-o-toluidine, 11.5 parts of sodium, 2.5 parts copper bronze powder, and 100 parts of diethylaniline is treated in the manner described in Example 7. The solid product (α-phenylindole), obtained on the decomposition of the sodium salt, is filtered off and recrystallized from ethyl acetate. It crystallizes in the form of colourless plates or prisms, having a melting point of 185° C.

*Example 10*

A mixture of 56.4 parts malonyl-di-o-toluidide, 18.4 parts of sodium, 2 parts of copper bronze powder and 150 parts of diethylaniline, is boiled and stirred for 2 hours. The solvent is distilled off and the product is worked up in the usual way. This compound, which we consider to be di-α-indolyl-methane, has not hitherto been described. It has a boiling point of 152–153° C. at 15 mm. pressure.

Example 11

18 parts of o-ethylacetanilide, 5 parts of sodium, 1 part of copper bronze powder, and 50 parts of diethylaniline are treated as described in the previous examples. The fraction of boiling point 188–196° C. at 20 mm. pressure is purified by conversion into picrate (brown needles from alcohol, melting point 153° C.) and the 2,3-dimethylindole, liberated by decomposition with dilute alkali, is crystallized from light petroleum. It has a melting point of 104–105° C.

Having now particularly described and ascertained the nature of our said invention and in what manner the same is to be performed, we declare that what we claim is:—

1. A process for producing an indole which comprises heating together an inert solvent, sodium, and a compound having the following general formula:

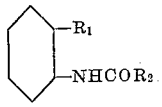

in which $R_1$ and $R_2$ represent alkyl radicals of the lower aliphatic series.

2. The process described in claim 1 wherein the inert solvent is diethylaniline, and wherein the reaction is carried out in the presence of a copper catalyst.

3. A process for producing α-methyl-indole which comprises heating together acetyl-o-toluidine, diethylaniline, and sodium.

4. A process for producing α-methyl-indole which comprises heating together, in the presence of a copper catalyst, acetyl-o-toluidine, diethylaniline, and sodium.

5. A process for producing α-methyl-indole which comprises heating together, in the presence of copper-bronze, acetyl-o-toluidine, diethylaniline, and sodium.

6. The process of producing an indole, which comprises heating together, in an inert organic liquid, an alkali metal and an ortho-alkyl-aryl-amide of the general formula

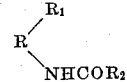

in which R represents an aromatic radical of the benzene series, $R_1$ represents a lower aliphatic radical, $R_2$ represents a lower alkyl radical, the phenyl nucleus, or the group

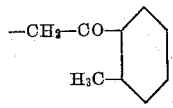

and the substituents $R_1$ and $NHCOR_2$ are in ortho position to each other.

7. A process as defined in claim 6, wherein the reaction mass contains further a copper catalyst.

8. A process as defined in claim 6, wherein the organic liquid is a secondary organic amine.

9. A process as defined in claim 6, wherein the organic liquid is diethylaniline.

10. A process as defined in claim 6, wherein the organic liquid is diethylaniline, and the mixture contains further a copper catalyst.

11. α, α-di-indolyl-methane.

12. The process of producing an indole, which comprises heating together an inert liquid, an alkali-metal and an acyl derivative of an ortho-alkyl-phenyl-amine.

HENRY ALFRED PIGGOTT.
ERNEST HARRY RODD.